Oct. 22, 1957  J. W. SADLER  2,810,208
DAIRYMEN'S SUN DRIER AND SWEETENER
Filed March 1, 1955  3 Sheets-Sheet 1

Inventor
John W. Sadler
By [signature]
Attorneys

Oct. 22, 1957     J. W. SADLER     2,810,208
DAIRYMEN'S SUN DRIER AND SWEETENER
Filed March 1, 1955     3 Sheets-Sheet 2
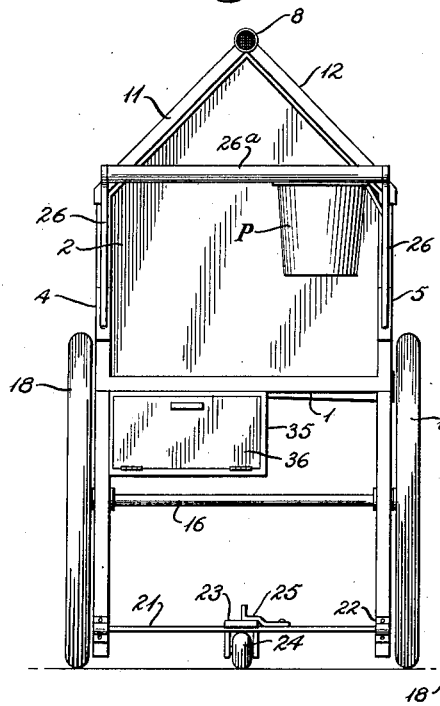
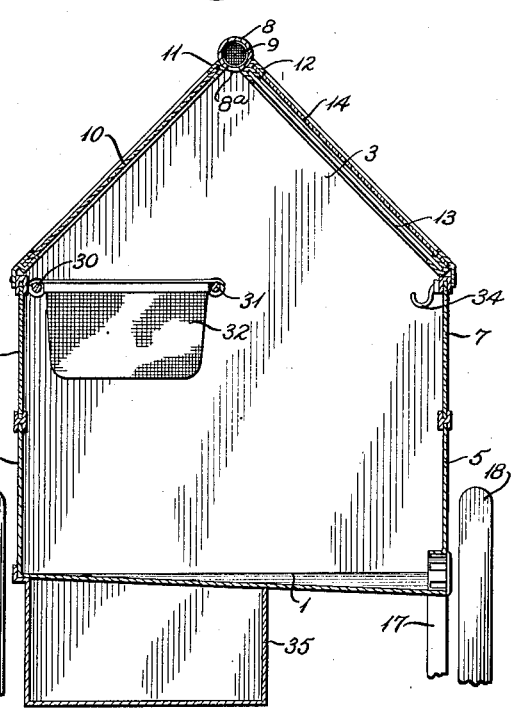
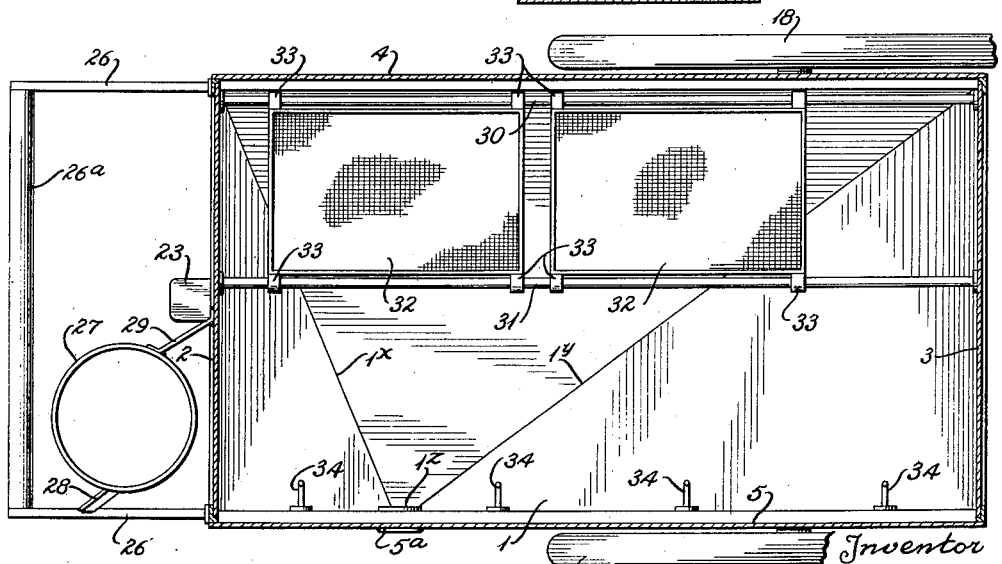
Inventor
John W. Sadler Oct. 22, 1957  J. W. SADLER  2,810,208
DAIRYMEN'S SUN DRIER AND SWEETENER
Filed March 1, 1955  3 Sheets-Sheet 3

Inventor
John W. Sadler
By Alexander Dowell
Attorneys

United States Patent Office 2,810,208
Patented Oct. 22, 1957

2,810,208

DAIRYMEN'S SUN DRIER AND SWEETENER

John W. Sadler, Albuquerque, N. Mex.

Application March 1, 1955, Serial No. 491,277

8 Claims. (Cl. 34—93)

This invention is a novel improvement in portable sun driers and sweeteners particularly adapted for use by dairymen or farmers, and the principal objects of the invention are to provide a drier and sweetener adapted to receive various parts of the milking machines, also the milk and cream separator, and utensils, the same having a transparent top, and partially transparent sides of quartz glass to protect the washed separator or machine parts and utensils placed therein, from accumulation of dust and insects; also to provide a sun drier and sweetener having a sump in its bottom for holding a wetting agent, brushes, and the like with which the utensils or separator parts are washed before being placed in baskets within the sun drier and sweetener, and before the latter is placed in the sun and left there a sufficient time for the separator and machine parts and utensils to dry in the sun, the separator being thereafter wheeled into the barn for use after the next milking operation.

Another object of the invention is to provide a portable sun drier and sweetener in which the same is supported at one end on two wheels of the bicycle type, and at the other end by one wheel of the swivel caster type, the bottom, ends, and half the height of the sides of the drier and sweetener being formed of sheet aluminum, whereas the upper halves of the sides and the top, are formed of quartz or other transparent or translucent glass.

Another object of the invention is to provide a portable sun drier and sweetener of the above type having a roof ridge which is tubular, and provided with screens at each end for admitting air into the upper end of the sun drier and sweetener, or vice versa.

A further object of the invention is to provide a portable sun drier and sweetener of the above type having an outlet adjacent the bottom which is screened for ventilation.

A still further object of the invention is to provide a novel sun drier and sweetener having a quartz glass top into which cleansed separator and machine parts and utensils may be placed so that the drier and sweetener may be wheeled into the sunlight, the fresh air having free ingress and egress therefrom, so that the sun's rays will efficiently dry and sweeten the dairy utensils and will operate better than in cases in which chemicals and other means are used to cleanse and dry and sweeten the utensils. The utensils can be washed, the drier and sweetener having baskets adapted to receive small parts; and the drier and sweetener being adapted to be wheeled to such position where it is needed without danger of contamination of the parts; the drier and sweetener having quartz or other glass in its top and the upper portions of its sides, to admit the sun's rays in order to effect thorough drying and sweetening of the washed parts within the drier.

I will explain the invention with reference to the accompanying drawings, which illustrate one practical embodiment thereof, to enable others familiar with the art to adopt and use the same; and will summarize in the claims the novel features of construction and novel combinations of parts, for which protection is desired.

In said drawings:

Fig. 3 is a rear end elevation of my novel portable sun drier and sweetener.

Fig. 4 is a transverse section on line 4—4, Fig. 2.

Fig. 5 is a horizontal section on line 5—5, Fig. 2.

Figure 2:
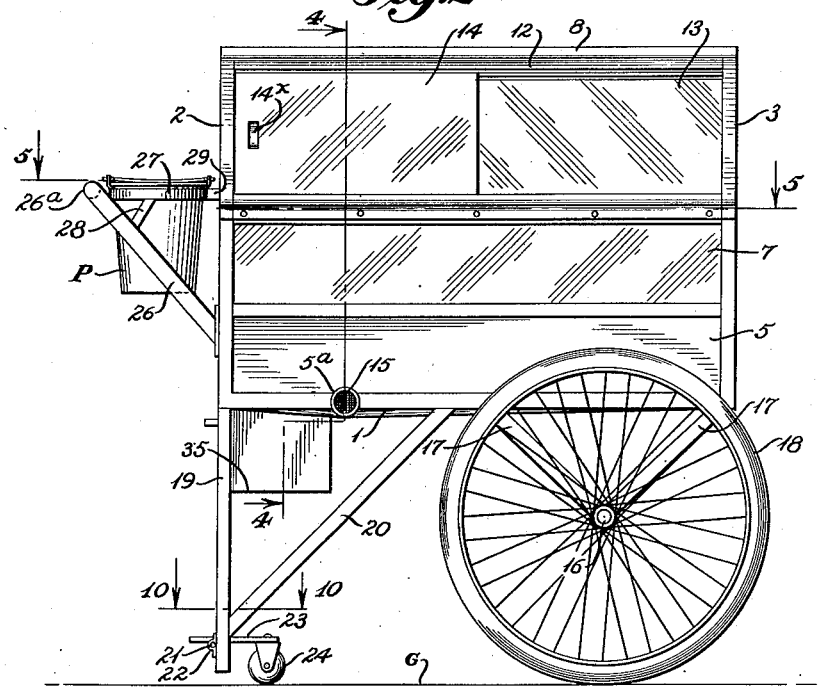
Fig. 2 is a side elevation thereof.
Figure 6:
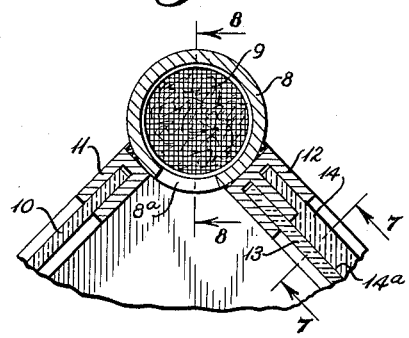
Fig. 6 is a transverse section through the roof ridge, showing the ventilator screens, and showing the means for connecting the glass roof panels to the said ridge.
Figure 8:
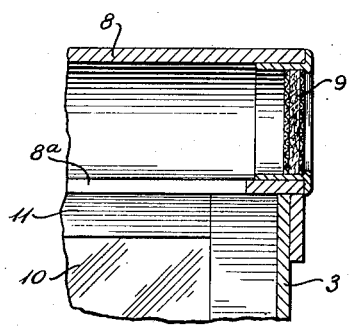
Fig. 8 is a section on the line 8—8, Fig. 6.

As shown in the drawings, my novel portable sun drier and sweetener comprises a container consisting of a bottom 1, preferably of sheet aluminum of substantially rectangular shape; also ends 2 and 3, also preferably formed of sheet aluminum and secured to the ends of the bottom 1 in any desired manner, the upper portions of the ends 2 and 3 converging together at substantially a 90° angle, as shown in Figs. 3 and 4. The ends 2 and 3 are secured along their side edges in any desired manner to aluminum side plates 4 and 5, which side plates extend only a slight distance above bottom 1. The upper portions of the sides 4 and 5 are formed of quartz or other glass 6 and 7, Figs. 2 and 4, the end and bottom edges of which are secured to the adjacent parts in any desired manner. The quartz glass sides 6 and 7 terminate below the tops of the end members 2 and 3 and below the ridge pole 8 which, as shown in Figs. 4 and 6, constitutes a tube preferably formed of aluminum the ends of which are open; and tube 8 connects the apices of the end plates 2 and 3, the lower portion of tube 8 being open as at 8a, Figs. 6 and 8, to permit ingress and egress of air from the ends of tube 8 into the interior of the sun drier and sweetener at the top thereof. In each end of tube 8 is mounted a copper or other screen 9 in any desired manner, adapted to filter the air entering the upper end of the drier.

Figure 1:
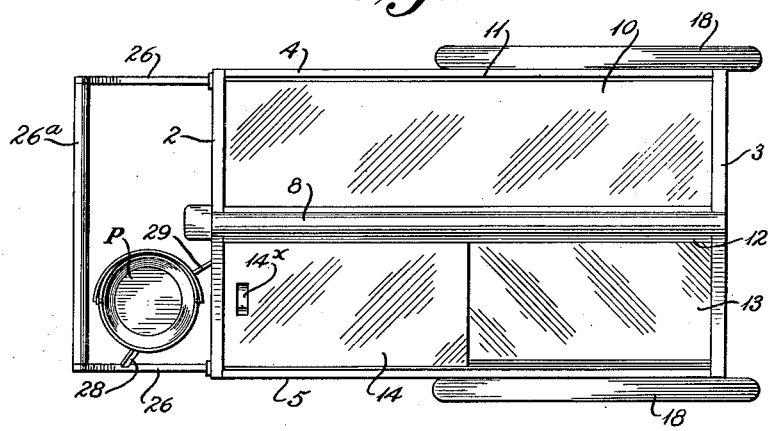
Figure 1 is a top plan view of my novel portable sun drier and sweetener.
Figure 7:
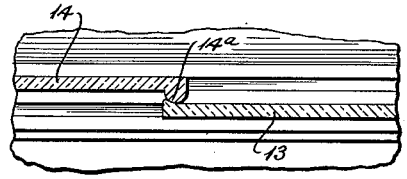
Fig. 7 is a section on the line 7—7, Fig. 6.

Connecting the upper end of the glass rear side panel 6 with ridge tube 8 is a quartz panel 10, Figs. 4 and 6, the edges of which are secured by frame members 11 which are in turn secured to the ridge tube 8 and to the top of the quartz panel 6, and to the inclined upper edges of the ends 2 and 3 of the sun drier and sweetener, quartz panel 10 being thus fixedly mounted on the drier and covering the rear half thereof. The front of the top of the sun drier and sweetener carries a frame 12, Figs. 4 and 6, in one end of which is mounted a fixed quartz panel 13 (Figs. 1 and 2) extending half the length of the frame 12, also carrying a slidable quartz panel 14, Figs. 4, 6 and 7, which is offset from the plane of the panel 13 and adapted when shifted by handle 14x to overlie fixed panel 13 so as to permit access to the interior of the sun drier and sweetener. The panel 14, as shown in Fig. 7, is provided with an integral bead 14a, so that the rear end of the slidable panel 14 and the surface of fixed panel 13 will remain in sliding contact at all times to form an effective seal between the sliding and fixed panels. Thus, when the sliding panel 14 is closed, the inside of the sun drier and sweetener will be substantially closed to atmosphere except through the ridge tube 8, and the sun's rays will be permitted to enter the drier through the quartz panels 6, 7, 10, 13 and 14, at all times.

Figure 9:
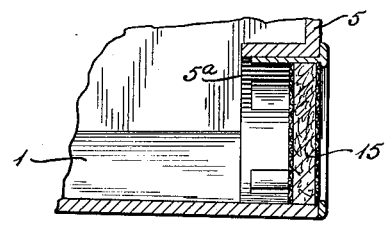
Fig. 9 is a section through the drain vent, including the adjacent parts.

The bottom 1 of the sun drier and sweetener is crimped along lines 1x and 1y extending from the corners of the bottom 1 at one side thereof to a point 1z on the opposite side of the drier bottom 1 intermediate the end plates 2 and 3, as shown in Fig. 5, the crimping being downwardly so that any liquid in the sun drier and sweetener may drain towards the low point 1z. In the side plate 5 adjacent point 1z is a circular opening 5a permitting any moisture collecting at such point to drain outwardly of the drier, a filter screen 15, Fig. 9, being disposed in opening 5a to prevent the ingress of any foreign matter through opening 5a into the interior of the drier.

Figure 10:
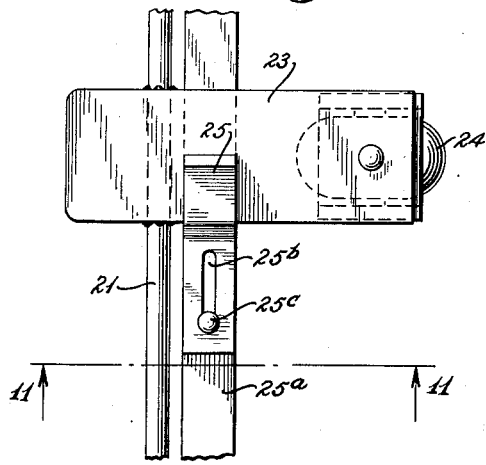
Fig. 10 is a horizontal section on the line 10—10, Fig. 2.
Figure 11:
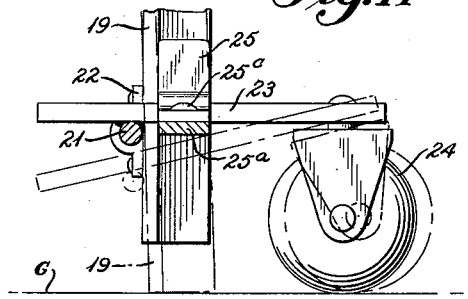
Fig. 11 is a section on the line 11—11, Fig. 10.

The sun drier and sweetener is portable, the same having an axle 16 which is supported by brackets 17 (Fig. 2) depending from the bottom 1 adjacent one end thereof, axle 16 having mounted thereon wheels 18 preferably of the bicycle type. At the opposite end of bottom 1 are depending legs 19 stiffened by braces 20 to lend rigidity thereto, the lower ends of the legs 19 being connected by a cross rod 21, Figs. 2, 10 and 11, mounted in brackets 22, upon which rod 21 is mounted a pivotal arm 23 carrying at its inner end a swivelling caster-type roller 24, the swinging of arm 23 being governed by a leaf spring 25, Figs. 10 and 11, which spring 25 is slidably mounted on a cross member 25a extending parallel with rod 21 and spaced therefrom, spring 25 having an axial slot 25b therein receiving a headed screw or bolt 25c permitting spring 25 to slide upon the member 25a to bring same into and out of position in which the spring overlies the arm 23. When the spring 25 overlies the arm 23 the roller 24 will contact the ground support and the lower ends of the legs 19 will be raised above the ground surface G, but when spring 25 is shifted to face the arm 23, the lower ends of the legs 19, as shown in dotted lines in Fig. 11, will rest upon the ground surface G. Any other type of caster wheel or mounting therefore may be used.

At the end of the sun drier and sweetener adajcent the legs 19 are a pair of upwardly inclined brackets 26 which are connected at their outer rear ends by a handle bar 26a disposed at a convenient height above the ground G. Adjacent one of the brackets 26 is a circular ring 27 (Fig. 5) supported by brackets 28 and 29 to one said bracket 26 and to the rear face of end plate 2 of the drier, in which ring 27 a pail or the like P is adapted to be placed which may be of sufficient capacity for use in washing the parts which are to be placed into the drier. The brackets 28 and 29 may be welded or otherwise secured to the bracket 26 and to the end plate 2 of the drier.

Within the sun drier and sweetener adjacent the wall 4–6 is mounted a horizontal rod 30, and spaced therefrom and parallel therewith extending between the ends 2 and 3 is a second horizontal rod 31, Figs. 4 and 5, said rods being secured to the ends 2 and 3 in any desired manner and being adapted to support thereon a plurality of wire baskets 32 having hooks 33 (Fig. 5) at their corners adapted to overlie the said rods 30 and 31 respectively, said baskets being adapted to receive any washed utensils or parts used in the milking or separating machines.

On the opposite side of the sun drier and sweetener from the baskets 32 are a series of hooks 34, Figs. 4 and 5, from which may be suspended larger parts of the milking or separating machines or larger utensils, the materials suspended from the hooks 34 and carried in the baskets 32 being exposed to the direct rays of the sun through the quartz glass panels 6, 7, 10, 13 and 14.

Below the bottom 1 at the handle end of the sun drier and sweetener is a compartment 35 having a door 36, Fig. 3, in its rear end, said compartment being adapted to receive or hold any suitable wetting agents for cleansing the utensils and machine parts; also for holding any brushes or other tools used in cleaning the parts.

The above sun drier and sweetener provides an efficient means of drying and sweetening utensils or machine parts used in connection with dairy farming, and provides a drier in which the utensils and parts can be placed after being washed and then left for drying and sweetening purposes in a position exposed to the sun's rays, the drier preventing the parts from becoming contaminated by the outside air and preventing the same from taking on musty odors or flavors.

The sun drier and sweetener has a place for receiving a pail to use or wash the parts with the wetting agent; also includes baskets for holding small parts of the milking or separating machines. The drier being portable can be wheeled whereever needed without danger of upsetting or interference by farm animals or the like, and the interior of the drier will always be dry and sweet as needed. The top of the drier and the upper portions of the sides are formed of quartz glass to permit the sun's rays to penetrate readily therethrough, and the drier includes a small compartment adapted to normally hold a wetting agent and any brushes or other tools utilized in initially cleaning the utensils or machine parts. If desired, the quartz glass panels may be reinforced with wire mesh or other reinforcing material.

At all times fresh air may enter the drier through the screened ends of the ridge tube 8, and may pass out of the drier through the screened opening 5a adjacent the bottom of the drier, any water or moisture collecting in the bottom of the drier also passing through the screened opening 5a.

I do not limit my invention to the exact form shown in the drawings, for obviously changes may be made therein within the scope of the claims.

I claim:

1. A sun drier and sweetener comprising a casing having a bottom, ends, sides and top; a hollow tube connecting the tops of the ends, said tube being open along its lower periphery; the bottom, ends, and lower portions of the sides being solid, and the upper portions of the sides and the top being formed of translucent panels; said top having a sliding panel permitting access into the said casing; the bottom being crimped downwardly from an outlet opening at one side of the bottom to the corners of the bottom at the opposite side; filters disposed in said outlet opening and in the ends of the tube; and means in the casing for supporting articles to be dried.

2. In a drier as set forth in claim 1, said means comprising a pair of spaced parallel rods along one side of and within the casing; and a series of reticulated baskets disposed between the rods having supporting means engaging the said pair of rods.

3. A portable sun drier and sweetener comprising a wheeled casing having a bottom, ends, sides and top; a hollow tube connecting the tops of the ends, said tube being open along its lower periphery; the bottom, ends, and lower portions of the sides being solid; and the upper portions of the sides and the top being formed of translucent panels; said top having a sliding panel permitting access into said casing; the bottom being crimped downwardly from an outlet opening at one side of the bottom to the corners of the bottom at the opposite side; filters disposed in said outlet opening and in the ends of the tube; and means in the casing for supporting articles to be dried.

4. In a drier as set forth in claim 3, said means comprising a pair of spaced parallel rods along one side of and within the casting; and a series of reticulated baskets disposed between the rods having a supporting means engaging the said pair of rods.

5. A portable sun drier and sweetener comprising a wheeled casing having a botom, ends, sides and top; the ends having upwardly converging upper edges; a hollow ridge tube connecting the tops of the ends, said tube being open along its lower periphery; the bottom, ends, and lower portions of the sides being solid; and the upper portions of the sides and the top being formed of translucent panels; one top panel being fixed and the other having a sliding panel and a fixed panel; the bottom being crimped downwardly from an outlet opening at one side of the bottom to the corners of the bottom at the other side; filters disposed in said outlet opening and in the ends of the ridge tube; and means in the casing for supporting articles to be dried.

6. In a drier as set forth in claim 5, said means comprising spaced hooks within the casing along one side thereof; a pair of spaced parallel rods along the other side and within the casing; and a series of baskets between the rods having hooks at their corners engaging the said pair of rods.

7. A portable sun drier and sweetener comprising a wheeled casing having a bottom, ends, sides and top; the ends having upwardly converging upper edges; a hollow ridge tube connecting the tops of the ends, said tube being open along its lower periphery; the bottom, ends, and lower portions of the sides being formed of sheet metal, and the upper portions of the sides and the top being formed of quartz glass panels; one top panel being fixed and the other top panel having a sliding panel and a fixed panel; the bottom being crimped downwardly from an outlet opening at one side of the bottom to the corners of the bottom at the other side; screens in said outlet opening and in the ends of the ridge tube; and means in the casing for supporting articles to be dried.

8. In a drier as set forth in claim 7, said means comprising spaced hooks within the casing along one side thereof; a pair of spaced parallel rods along the other the side and within the casing; and a series of wire baskets between the rods having hooks at their corners engaging the said pair of rods.

References Cited in the file of this patent

UNITED STATES PATENTS

| | | |
|---|---|---|
| 462,320 | Miller | Nov. 3, 1891 |
| 1,760,854 | Wright | May 27, 1930 |
| 1,985,412 | Jackson | Dec. 25, 1934 |
| 2,663,048 | Ross | Dec. 22, 1953 |